US011485876B2

(12) United States Patent
Seo et al.

(10) Patent No.: US 11,485,876 B2
(45) Date of Patent: Nov. 1, 2022

(54) OPTICAL FILM HAVING ORGANIC AND INORGANIC PARTICLES OF DIFFERENT SIZES, AND POLARIZING PLATE COMPRISING SAME

(71) Applicant: LG CHEM, LTD., Seoul (KR)

(72) Inventors: Jung Hyun Seo, Daejeon (KR); Yeong Rae Chang, Daejeon (KR); Jin Young Park, Daejeon (KR); Han Na Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 594 days.

(21) Appl. No.: 16/337,140

(22) PCT Filed: Dec. 18, 2017

(86) PCT No.: PCT/KR2017/014953
§ 371 (c)(1),
(2) Date: Mar. 27, 2019

(87) PCT Pub. No.: WO2018/111054
PCT Pub. Date: Jun. 21, 2018

(65) Prior Publication Data
US 2019/0225831 A1    Jul. 25, 2019

(30) Foreign Application Priority Data

Dec. 16, 2016 (KR) .................... 10-2016-0173016
Dec. 15, 2017 (KR) .................... 10-2017-0173548

(51) Int. Cl.
*C08J 7/04* (2020.01)
*C09D 151/08* (2006.01)
(Continued)

(52) U.S. Cl.
CPC ........ *C09D 151/08* (2013.01); *C08F 290/061* (2013.01); *C08G 18/8175* (2013.01);
(Continued)

(58) Field of Classification Search
CPC ......... G02B 1/11–118; G02F 1/133502; G02F 2201/38
See application file for complete search history.

(56) References Cited

U.S. PATENT DOCUMENTS 9,684,098 B2    6/2017    Sakajiri et al.
2006/0182896 A1    8/2006    Murakami et al.
(Continued)

FOREIGN PATENT DOCUMENTS

JP    2004-025650 A    1/2004
JP    2004-333702 A    11/2004
(Continued)

OTHER PUBLICATIONS

Extended European Search Report issued for European Patent Application No. 17880476.1 dated Aug. 9, 2019, 10 pages.
(Continued)

*Primary Examiner* — Ryan S Dunning
(74) *Attorney, Agent, or Firm* — Rothwell, Figg, Ernst & Manbeck, P.C.

(57) ABSTRACT

The present invention relates to a resin composition for forming an optical film, an optical film, and a polarizing plate, in which the resin composition for forming an optical film improves adhesion between an antiglare layer and a light-transmitting substrate film and enables the antiglare layer and the optical film to exhibit excellent optical properties such as appropriate haze, low gloss value, and excellent antiglare properties. The composition for forming an optical film is a resin composition for forming an optical film for forming an infiltration layer and an antiglare layer having surface irregularities on a light-transmitting substrate film, and comprises: a binder-forming compound including a polyfunctional (meth)acrylate-based compound having three or more functionalities, and a permeable compound having a hydrophilic functional group and a photo-curable
(Continued)

functional group; two or more light-transmitting fine particles having a sub-micron (sub-μm) scale; and a permeable solvent capable of dissolving at least a part of the light-transmitting substrate film, wherein the binder-forming compound and the permeable solvent have a weight ratio of 1:0.04 or more.

6 Claims, 2 Drawing Sheets

(51) Int. Cl.
| | |
|---|---|
| G02B 1/11 | (2015.01) |
| C08L 1/10 | (2006.01) |
| G02B 1/111 | (2015.01) |
| C08F 290/06 | (2006.01) |
| C09D 175/16 | (2006.01) |
| C08G 18/81 | (2006.01) |
| C08J 7/043 | (2020.01) |
| C08J 7/046 | (2020.01) |
| C08J 7/056 | (2020.01) |
| G02B 5/30 | (2006.01) |

(52) U.S. Cl.
CPC .............. *C08J 7/042* (2013.01); *C08J 7/043* (2020.01); *C08J 7/046* (2020.01); *C08J 7/0427* (2020.01); *C08J 7/056* (2020.01); *C08L 1/10* (2013.01); *C09D 175/16* (2013.01); *G02B 1/11* (2013.01); *G02B 1/111* (2013.01); *C08J 2333/08* (2013.01); *C08J 2351/08* (2013.01); *C08J 2367/02* (2013.01); *C08J 2433/08* (2013.01); *C08J 2433/12* (2013.01); *C08J 2433/14* (2013.01); *C08J 2451/00* (2013.01); *G02B 5/3025* (2013.01)

(56) References Cited

U.S. PATENT DOCUMENTS

| | | | |
|---|---|---|---|
| 2008/0218865 A1 | 9/2008 | Iwata et al. | |
| 2008/0221290 A1 | 9/2008 | Horio | |
| 2009/0002831 A1 | 1/2009 | Mikami et al. | |
| 2009/0021834 A1 | 1/2009 | Iwata et al. | |
| 2009/0061165 A1* | 3/2009 | Iwata | G02B 1/11 |
| | | | 428/179 |
| 2009/0268299 A1 | 10/2009 | Furui et al. | |
| 2010/0283944 A1 | 11/2010 | Kodama et al. | |
| 2013/0057955 A1* | 3/2013 | Kodama | G02F 1/133502 |
| | | | 359/488.01 |
| 2013/0216729 A1 | 8/2013 | Kim et al. | |
| 2013/0250414 A1 | 9/2013 | Eguchi et al. | |
| 2014/0002904 A1 | 1/2014 | Kishi et al. | |
| 2014/0211316 A1 | 7/2014 | Furui et al. | |
| 2014/0227482 A1 | 8/2014 | Shibata et al. | |
| 2014/0254020 A1* | 9/2014 | Sakajiri | G02B 5/0221 |
| | | | 359/601 |
| 2016/0077239 A1 | 3/2016 | Asahi et al. | |
| 2016/0077240 A1 | 3/2016 | Asahi et al. | |
| 2016/0146978 A1 | 5/2016 | Lee et al. | |

FOREIGN PATENT DOCUMENTS

| | | | |
|---|---|---|---|
| JP | 2009-061686 A | 3/2009 | |
| JP | 2009-086360 A | 4/2009 | |
| JP | 2009-262148 A | 11/2009 | |
| JP | 2012-234163 A | 11/2012 | |
| JP | 2013-045031 A | 3/2013 | |
| JP | 2013-083914 A | 5/2013 | |
| JP | 2013-105160 A | 5/2013 | |
| JP | 2013-142773 A | 7/2013 | |
| JP | 2014-029457 A | 2/2014 | |
| JP | 2014-063050 A | 4/2014 | |
| JP | 2014-240956 A | 12/2014 | |
| JP | 2016-526705 A | 9/2016 | |
| KR | 10-1189198 B1 | 10/2012 | |
| KR | 10-1202050 B1 | 11/2012 | |
| KR | 10-1205252 B1 | 11/2012 | |
| KR | 10-2013-0041741 A | 4/2013 | |
| KR | 10-1296825 B1 | 8/2013 | |
| KR | 10-2013-0127984 A | 11/2013 | |
| KR | 10-1392301 B1 | 5/2014 | |
| KR | 10-2014-0072859 A | 6/2014 | |
| KR | 10-1408637 B1 | 6/2014 | |
| KR | 10-2016-0031448 A | 3/2016 | |
| KR | 10-1656454 B | 9/2016 | |
| WO | 2009-041321 A1 | 4/2009 | |
| WO | 2012-039279 A1 | 3/2012 | |
| WO | 2016-103685 A1 | 6/2016 | |

OTHER PUBLICATIONS

International Search Report & Written Opinion issued for PCT/KR2017/014953 dated Jul. 16, 2018, 13 pages.

* cited by examiner

[FIG. 1]
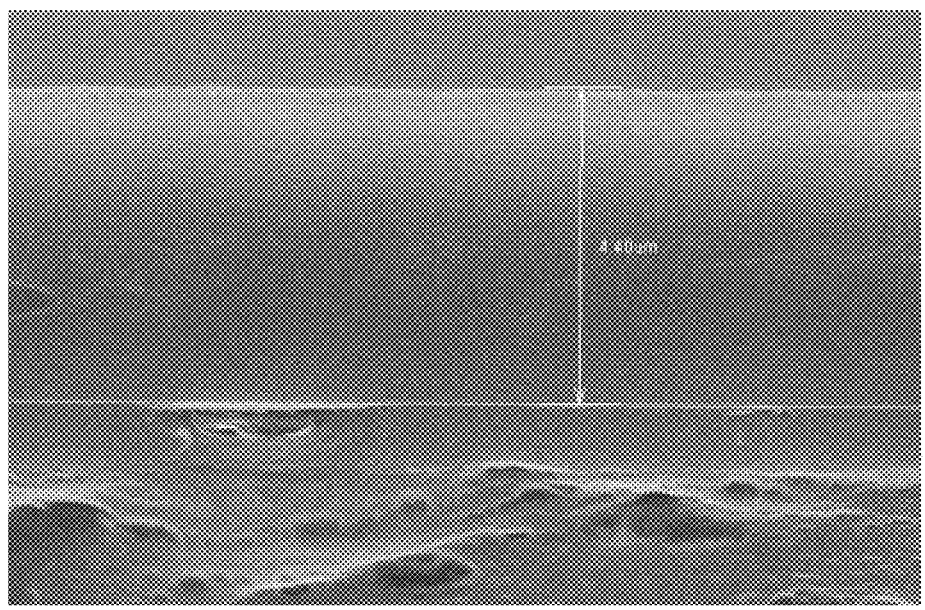

[FIG. 2]
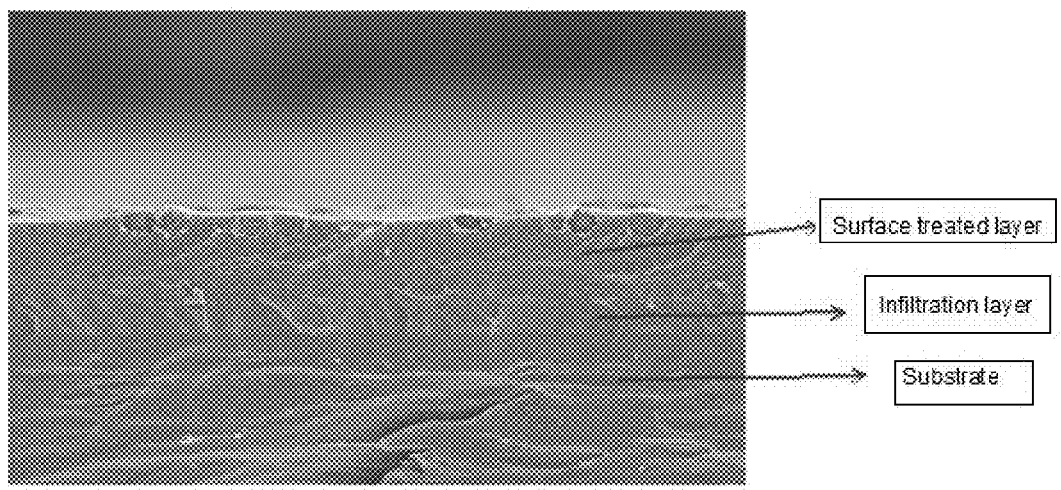

OPTICAL FILM HAVING ORGANIC AND INORGANIC PARTICLES OF DIFFERENT SIZES, AND POLARIZING PLATE COMPRISING SAME

CROSS-REFERENCE TO RELATED APPLICATION(S)

This application is a 35 U.S.C. § 371 National Phase Entry Application from PCT/KR2017/014953, filed on Dec. 18, 2017, and designating the United States, which claims the benefit of filing dates of Korean Patent Application No. 10-2016-0173016 filed with Korean Intellectual Property Office on Dec. 16, 2016 and Korean Patent Application No. 10-2016-0173548 filed with Korean Intellectual Property Office on Dec. 15, 2017, the entire contents of which are incorporated herein by reference.

TECHNICAL FIELD

The present invention relates to a composition for forming an optical film, an optical film, and a polarizing plate, in which the composition for forming an optical film improves adhesion between an antiglare layer and a light-transmitting substrate film and enables the antiglare layer and the optical film to exhibit excellent optical properties such as appropriate haze value, low gloss value, and excellent antiglare properties.

BACKGROUND

In an image display device such as an organic light emitting diode (OELD) or a liquid crystal display (LCD), it is required to prevent a decrease in contrast due to a reflection of external light or a reflection of an image, and a deterioration of the visibility. For this purpose, in order to reduce a reflection of an image and a reflection of light by using scattering of light or optical interference, an optical laminated film such as an antireflection film is formed on the surface of the image display device.

For example, in a liquid crystal display or the like, an optical laminated film including an antiglare layer has been generally formed. Such an antiglare layer mainly includes a binder and fine particles contained in the binder, and these fine particles are usually formed so that a part thereof protrudes on the surface of the binder. That is, since the antiglare layer has surface irregularities due to fine particles protruding on the surface of the binder, it can control light scattering/light reflection, and the like to suppress deterioration of the visibility of the image display device.

However, since the optical film having the antiglare layer as described above is usually formed on the outermost surface of an image display device to control light scattering/light reflection, etc., it is often subjected to an impact from the outside. For this reason, mechanical properties such as excellent adhesion between the antiglare layer and the substrate film, and hardness are required.

However, in the case of previously known optical films, the adhesion and hardness were often not sufficient depending on the types of the substrate film and the binder. In addition, when attempting to secure the adhesion or hardness by changing the type of the binder or the like, the optical properties of the antiglare layer or the like are rather deteriorated, and thus the antiglare properties for controlling the light scattering/light reflection cannot be exhibited properly.

Technical Problem

The present invention provides a composition for forming an optical film which improves adhesion between an antiglare layer and a light-transmitting substrate film and enables the antiglare layer and the optical film to exhibit excellent optical properties such as appropriate haze value, low gloss value, and excellent antiglare properties.

Further, the present invention provides an optical film exhibiting the optical properties together with improved adhesion between the antiglare layer and the substrate film.

Further, the present invention provides a polarizing plate comprising the optical film.

Technical Solution

The present invention provides a resin composition for forming, on a light-transmitting substrate film, an infiltration layer and an antiglare layer having surface irregularities to provide an optical film, which comprises:

a binder-forming compound including a polyfunctional (meth)acrylate-based compound having three or more functionalities, and a permeable compound having a hydrophilic functional group and a photo-curable functional group;

two or more light-transmitting fine particles having a sub-micron (sub-μm) scale; and a permeable solvent capable of dissolving at least a part of the light-transmitting substrate film, wherein the binder-forming compound and the permeable solvent have a weight ratio of 1:0.04 or more, and wherein the permeable solvent is contained in an amount of 1 to 4.5 parts by weight based on 100 parts by weight of the total of the resin composition for forming an optical film.

The present invention also provides an optical film comprising:

a light-transmitting substrate film;

an infiltration layer having at least a part that is infiltrated into the light-transmitting substrate film so as to overlap with at least a part of the light-transmitting substrate film, and including a first binder containing a first (meth)acrylate-based cross-linked polymer; and an antiglare layer formed directly on top of the infiltration layer, having surface irregularities and including a second binder containing a second (meth)acrylate-based cross-linked polymer, and at least two light-transmitting fine particles having a sub-micron (sub-μm) scale dispersed in the second binder, wherein the infiltration layer has a thickness of 100 nm or more and 2 μm or less, and wherein the antiglare layer has a total haze value of 1 to 5% and a 60-degree gloss value of 75% to 90%.

In addition, the present invention provides a polarizing plate comprising the optical film.

Hereinafter, the resin composition for forming, on a light-transmitting substrate film, an infiltration layer and an antiglare layer to provide an optical film, the optical film, and the polarizing plate including the optical film according to embodiments of the present invention will be described in detail.

As used herein, the micron (μm) scale refers to having a particle size or particle diameter of less than 1 mm, i.e., less than 1000 μm, the nano (nm) scale refers to having a particle size or particle diameter of less than 1 μm, i.e., less than 1000 nm, and the sub-micron (sub-μm) scale refers to having a particle size or particle diameter of micron scale or nanoscale.

Further, the photopolymerizable compound is collectively referred to as a compound that causes cross-linking, curing, or polymerization when it is irradiated with light, for example, when it is irradiated with visible light or ultraviolet light.

Further, the (meth)acrylate refers to including both acrylate and methacrylate.

Further, the (co)polymer refers to including both a copolymer and a homopolymer.

Further, the permeable compound may be broadly referred to as a compound which has hydrophilic functional groups such as a hydroxyl group or an alkoxy group in its structure or which has a relatively small molecular weight and is easily moving in a solution, so that the compound can penetrate into the gap of the light-transmitting substrate film in which a part is dissolved, and can be cured/cross-linked with a polyfunctional photo-curable/photopolymerizable compound (for example, a polyfunctional (meth)acrylate-based compound) under these penetrated states to form a binder, resin or (co)polymer. For this purpose, the permeable compound may have a hydrophilic functional group such as a hydroxyl group or an alkoxy group so as to penetrate into the substrate film, may have a relatively small molecular weight, and may have a photo-curable functional group such as a (meth)acrylate group or a tetrahydrofurfuryl group so as to undergo a curing/crosslinking reaction with the polyfunctional photo-curable/photopolymerizable compound. In this case, the "relatively small" molecular weight means that the molecular weight of the permeable compound is smaller than the average molecular weight value of the total binder-forming compound contained in the composition.

Further, the permeable solvent may be broadly referred to as any organic solvent which can dissolve at least a part of the light-transmitting substrate film to form gaps through which the permeable compound can permeate into the substrate film.

Further, the hollow silica particles refer to silica particles which are derived from a silicon compound or an organic silicon compound and have an empty space on the surface and/or inside thereof.

According to one embodiment of the present invention, there is provided a composition for forming, on a light-transmitting substrate film, an infiltration layer, and an antiglare layer having surface irregularities to provide an optical film, which comprises:

a binder-forming compound including a polyfunctional (meth)acrylate-based compound having three or more functionalities, and a permeable compound having a hydrophilic functional group and a photo-curable functional group;

two or more light-transmitting fine particles having a sub-micron (sub-µm) scale; and a permeable solvent capable of dissolving at least a part of the light-transmitting substrate film, wherein the binder-forming compound and the permeable solvent have a weight ratio of 1:0.04 or more, and wherein the permeable solvent is contained in an amount of 1 to 4.5 parts by weight based on 100 parts by weight of the total of the resin composition for forming an optical film.

The resin composition according to one embodiment of the invention includes a plurality of light-transmitting fine particles and a polyfunctional (meth)acrylate-based compound with three or more functionalities which are basic components for forming an antiglare layer, while including predetermined permeable compound and permeable solvent.

As a result of experiments conducted by the present inventors, it has been found that when the antiglare layer is formed from a composition including such a permeable compound and a permeable solvent, an infiltration layer and an antiglare layer are respectively formed on the light-transmitting substrate film due to the following principle.

That is, when the resin composition of one embodiment is applied onto a light-transmitting substrate film such as cellulose ester-based substrate film (e.g., TAC substrate film), polyester-based substrate film (e.g., PET substrate film), poly(meth)acrylate-based substrate film (e.g., PMMA-based substrate film), polycarbonate-based substrate film, cyclo-olefin polymer(COP)-based substrate film, or acryl-based substrate film, the permeable solvent dissolves at least a part of the substrate film and will penetrate into such substrate to form gaps. Through such gaps, the permeable compound having the hydrophilic functional group such as a hydroxyl group or an alkoxy group, and having a relatively small molecular weight can penetrate into the substrate film. Next, when the photo-curing step for forming a binder of an antiglare layer is proceeded, as the photo-curable functional group of the permeable compound and the (meth)acrylate group of the polyfunctional (meth)acrylate-based compound react with each other, the cross-linked copolymer of the polyfunctional (meth)acrylate-based compound and the permeable compound may be formed in a state of being penetrated into the light-transmitting substrate film. As such a cross-linked copolymer becomes a binder of the infiltration layer, an infiltration layer may be formed having at least a part of which is infiltrated into the light-transmitting substrate film.

Further, on the infiltration layer and the light-transmitting substrate film, the antiglare layer may be formed while the cross-linked polymer of the polyfunctional (meth)acrylate-based compound is formed by photo-curing in a state of containing the light-transmitting fine particles.

In this way, while the infiltration layer in the light-transmitting substrate film, and the antiglare layer making direct contact with the infiltration layer is formed (in particular, such an antiglare layer can be formed in a state of forming a crosslinking bond with the infiltration layer), the adhesion between the substrate film and the antiglare layer can be greatly improved.

Furthermore, the composition of one embodiment contains the permeable compound and the permeable solvent in a predetermined ratio, and for example, it is contained in such a ratio that the weight ratio of the binder-forming compound and the permeable solvent is 1:0.04 or more, or 1:0.04 to 1:0.1, or 1:0.04 to 1:0.07. The permeable solvent may be contained in an amount of 1 to 4.5 parts by weight, or 1.2 to 4 parts by weight, or 1.3 to 3 parts by weight, based on 100 parts by weight of the composition of the embodiment. It has been found that the surface hardness and the optical properties of the antiglare layer and the optical film can also be maintained excellently owing to the content ratio and the content of the permeable compound and the permeable solvent.

If the proportion or content of the permeable solvent is excessively small or not contained, the infiltration layer is not properly formed, and the adhesion between the substrate film and the antiglare layer may be greatly reduced. When the proportion or content of the permeable solvent becomes excessively high, the permeable solvent, the permeable compound or the like may affect aggregation of the light-transmitting fine particles, for example, organic fine particles in the antiglare layer. Therefore, the surface hardness of the antiglare layer and the optical film is decreased, or the surface irregularities of the antiglare layer are not achieved properly, so that the antiglare properties and the optical properties of the antiglare layer may be greatly reduced, such as the glossiness of the antiglare layer being increased or the haze being beyond the appropriate range.

In contrast, when using the composition of the one embodiment described above, the adhesion between the antiglare layer and the light-transmitting substrate film is improved, and the antiglare layer and the optical film can exhibit excellent optical properties such as appropriate haze, low gloss and excellent anti-glare properties.

Hereinafter, the composition of one embodiment will be described specifically for each component.

First, the composition of one embodiment may be applied to a light-transmitting substrate film exhibiting light transmittance to at least visible light to form an infiltration layer and an antiglare layer, and representative examples thereof include cellulose ester-based substrate film, polyester-based substrate film, poly(meth)acrylate-based substrate film, polycarbonate-based substrate film, cyclo-olefin polymer (COP)-based substrate film, or acryl-based substrate film. By applying the composition of one embodiment to these substrate films, the infiltration layer can be appropriately formed, and an antiglare layer exhibiting excellent hardness and optical properties can be formed. As these cellulose ester-based substrate film, polyester-based substrate film, poly(meth)acrylate-based substrate film, polycarbonate-based substrate film, cyclo-olefin polymer(COP)-based substrate film, or acryl-based substrate film, any resin film previously known to be applicable as a substrate film of an optical film, such as triacetyl cellulose (TAC)-based film, polyethylene terephthalate (PET)-based substrate film, polymethyl methacrylate (PMMA)-based substrate film, cyclo-olefin polymer (COP)-based substrate film, aryl-based substrate film and the like can be applied without particular limitation.

Further, in consideration of excellent mechanical properties of the substrate film, water resistance, low moisture permeability, and excellent optical properties of the optical film formed from the composition of one embodiment, the light-transmitting substrate film may be a film having a thickness of 20 to 500 μm, or 30 to 200 μm, or to 150 μm. The polyester-based substrate film, poly(meth)acrylate-based substrate film, polycarbonate-based substrate film, cyclo-olefin polymer(COP)-based substrate film, or acryl-based substrate film, having such a thickness, can be appropriately used.

Meanwhile, the composition of one embodiment includes a polyfunctional (meth)acrylate-based compound with three or more functionalities and a penetrable compound having a hydrophilic functional group and a photo-curable functional group as a compound for forming a binder of the infiltration layer and the antiglare layer.

Among these compounds, as the polyfunctional (meth) acrylate-based compound having a (meth)acrylate group with three or more functionalities, a monomolecular type (meth)acrylate-based compound with three to six functionalities and/or a polyurethane-based polymer, a poly(meth) acryl-based polymer, or a polyester-based polymer, having a (meth)acrylate-based functional group with ten or more functionalities, may be used together.

By virtue of the composition of such a binder, the haze properties of the antiglare layer and the optical film can be maintained within a more preferable range, and it can contribute to further improve the image sharpness. If only the monomolecular type (meth)acrylate-based compound with three to six functionalities is used, the haze properties may deviate from an appropriate range, or the image sharpness may be degraded, and the adhesion between the substrate and the antiglare layer may be deteriorated.

Specific examples of the monomolecular type (meth) acrylate-based compound with three to six functionalities include a monomolecular type compound having 3 to 6 (meth)acrylate functional groups per molecule, and an aromatic ring (e.g., UA-306T as used in Examples provided hereinafter, etc.), pentaerythritol tri(meth)acrylate, trialkylolpropane tri(meth)acrylate or the like.

Further, as the polyurethane-based polymer, the poly (meth)acryl-based polymer, or the polyester-based polymer, having a (meth)acrylate-based functional group with ten or more functionalities, a polymer in which an average of 10 to 80 or an average of 10 to 50 (meth)acrylate-based functional groups are bonded to the backbone of the polyurethane-based polymer, poly(meth)acryl-based polymer or polyester-based polymer can be used, and these polymers may have a weight average molecular weight of 1000 to 200000.

Further, the monomolecular type (meth)acrylate-based compound with three to six functionalities, and the polymer having a (meth)acrylate-based functional group with ten or more functionalities may be used, for example, in a weight ratio of 1:1 to 10:1, or in a weight ratio of 1:1 to 5:1, or 1:1 to 3:1.

Meanwhile, as the permeable compound, any compound which has hydrophilic functional groups such as a hydroxyl group or an alkoxy group and has a relatively small molecular weight and thus easily can permeate into the light-transmitting substrate film and which can be photo-cured with the above-mentioned polyfunctional (meth)acrylate-based compound to form a binder of the infiltration layer. Specific examples of such permeable compounds include a monomolecular type compound having a hydrophilic functional group such as a hydroxyl group or an alkoxy group, and a photo-curable functional group such as a (meth) acrylate group or a tetrahydrofurfuryl group, for example, tetrahydrofufuryl alcohol (THFA), hydroxy(meth)acrylate compound, 2-hydroxyethyl acrylate, 2-(2-ethoxyethoxy) ethyl acrylate, or the like.

Such permeable compound may be contained in an amount of 1 to 10 parts by weight, or 1.5 to 5 parts by weight, or 1.7 to 4 parts by weight, based on 100 parts by weight of the total amount of the composition of the one embodiment. If the content of the permeable compound is excessively small or it is not contained, the infiltration layer is not properly formed, and the adhesion between the substrate film and the antiglare layer may be greatly reduced. Conversely, when the proportion of the permeable compound becomes excessively high, the permeable compound or the like may affect aggregation of the light-transmitting fine particles, for example, organic fine particles together with the permeable solvent in the antiglare layer. Consequently, the surface hardness of the antiglare layer and the optical film is decreased, or the surface irregularities of the antiglare layer are not achieved properly, so that the antiglare properties and the optical properties of the antiglare layer may be greatly reduced. In addition, when the content of the permeable compound and/or the permeable solvent is excessively high, the stability and productivity of the coating layer may also be lowered.

Meanwhile, the composition of one embodiment includes a plurality of light-transmitting fine particles capable of controlling light scattering/light reflection by forming surface irregularities on the antiglare layer. Further, as such light-transmitting fine particle has an appropriate particle diameter range, surface irregularities can be formed on the antiglare layer, and as such light-transmitting fine particle has a constant refractive index range, the antiglare layer allows control of external light scattering/light reflection.

In one example, as the light-transmitting fine particles, two or more kinds of fine particles having different particle diameters and refractive index, for example, organic fine particles of a micron (μm) scale and inorganic fine particles of a nanometer (nm) scale can be used together.

More specifically, as the organic fine particles, resin particles previously known to be usable in the antiglare layer and the like can be used without particular limitation, and specific examples thereof include resin fine particles containing polystyrene-based resin, poly(meth)acrylate-based resin or poly(meth)acrylate-co-styrene copolymer resin.

Further, such organic fine particles are, for example, spherical particles having a particle diameter of 1 to 5 μm or 1.5 to 4 μm, which may be those having a refractive index of 1.5 to 1.6, or 1.5 to 1.57, or 1.51 to 1.56, or 1.53 to 1.56.

As the inorganic fine particles, metal oxide fine particles including silica, alumina, zirconia or titania may be used. For example, they are spherical particles having a particle diameter of 10 nm to 300 nm, or 50 to 200 nm, which may be those having a refractive index of 1.4 to 1.75, or 1.4 to 1.65, or 1.42 to 1.48, or 1.42 to 1.45.

By including the organic/inorganic fine particles described above, the size of the unevenness projecting to the surface of the antiglare layer is uniform and is appropriately controlled, so that the haze properties and glossiness of the antiglare layer can be controlled within a preferable range. As a result, the antiglare layer and the optical film can exhibit more excellent antiglare property/optical property.

The above-mentioned light-transmitting fine particles may be contained in an amount of 1 to 30 parts by weight, or 2 to 20 parts by weight, or 3 to 10 parts by weight, or 3 to 5 parts by weight, based on 100 parts by weight of the total of the binder-forming compound and the light-transmitting fine particles contained in the composition of one embodiment. Further, the organic fine particles and the inorganic fine particles may be used in a weight ratio of 5:1 to 1:5, or 3:1 to 1:3, or 2:1 to 1:2. Thereby, the optical property/antiglare property of the antiglare layer and the optical film can be further improved. If the total content of the fine particles is excessively small, the surface irregularity on the antiglare layer is not properly realized and thus the scattering/reflection of external light cannot be controlled properly, and the antiglare property may be deteriorated. Conversely, if the total content of the fine particles is excessively large, the refraction of the transmitted image light is increased and the image sharpness of the optical film may be greatly lowered.

Meanwhile, the composition of one embodiment further includes a permeable solvent in addition to the above-described binder-forming compound and light-transmitting fine particles. As already mentioned above, such a permeable solvent is a component which dissolves a part of the light-transmitting substrate film so that the permeable compound can be permeated, thereby enabling formation of an infiltration layer.

Such a permeable solvent is contained in such a ratio that the binder-forming compound and the permeable solvent is in a weight ratio of 1:0.04 or more, or in a ratio of 1:0.04 to 1:0.1, or 1:0.04 to 1:0.07. The permeable solvent may be contained in an amount of 1 to 4.5 parts by weight, or 1.2 to 4 parts by weight, or 1.3 to 3 parts by weight, based on 100 parts by weight of the total of the composition of the embodiment. Due to the proportion and content of such permeable solvent, the surface hardness and the optical properties of the antiglare layer and the optical film in which the composition of one embodiment is formed can be kept excellent, despite the formation of the infiltration layer.

As for the permeable solvent, those skilled in the art can obviously selected and use a solvent capable of dissolving the substrate film at an appropriate level according to the type of the light-transmitting substrate film. However, when an infiltration layer/an antiglare layer is to be formed on a substrate film of the type already mentioned above, that is, a cellulose ester-based substrate film, a polyester-based substrate film, a poly(meth)acrylate-based substrate film, a cyclo-olefin polymer(COP)-based substrate film, or an acryl-based substrate film, a ketone-based solvent such as methyl ethyl ketone, methyl isobutyl ketone, or acetone, toluene, xylene, tetrahydrofuran and the like can be suitably used.

Meanwhile, the resin composition of one embodiment may further contain a photoinitiator and an organic solvent other than the permeable solvent in addition to the above-mentioned respective components.

In such composition, as the photoinitiator, conventionally known photoinitiators can be used without particular limitation. Examples of the photoinitiator may be one selected among 1-hydroxycyclohexyl phenyl ketone, benzyl dimethyl ketal, hydroxydimethylacetophenone, benzoin, benzoin methyl ether, benzoin ethyl ether, benzoin isopropyl ether, and benzoin butyl ether, or a mixture of two or more thereof.

At this time, the photoinitiator may be added in an amount of 0.1 to 10 parts by weight based on 100 parts by weight of the binder-forming compound. When the amount of the photoinitiator is less than 0.1 part by weight, sufficient photo-curing due to ultraviolet irradiation may not occur. When the amount of the photoinitiator exceeds 10 parts by weight, the adhesion between the antiglare layer and the substrate film or the like may be deteriorated. Furthermore, when the photoinitiator is contained in an excessively large amount, the antiglare layer and the optical film including the same may show yellowing due to the unreacted initiator with the lapse of time, so that the optical properties of the optical film may be deteriorated.

Further, in addition to the permeable solvent, the composition may further comprise an organic solvent as a medium for dispersing/dissolving the remaining components contained in the composition of one embodiment. When such an organic solvent is added, its constitution is not limited, but in consideration of ensuring an appropriate viscosity of the composition and the film strength of the finally formed film, the organic solvent may be used in an amount of preferably 50 to 700 parts by weight, more preferably 100 to 500 parts by weight, and most preferably 150 to 450 parts by weight based on 100 parts by weight of the binder-forming compound.

In this case, the type of usable organic solvent is not particularly limited, but one selected from the group consisting of lower alcohols having 1 to 6 carbon atoms, cellosolve, dimethylformamide and propylene glycol monomethyl ether, and mixtures of at least one thereof, which are different from the permeable solvent, may be used.

At this time, examples of the lower alcohol may be methanol, ethanol, isopropyl alcohol, butyl alcohol, isobutyl alcohol, diacetone alcohol, and the like. Further, the acetates may be methyl acetate, ethyl acetate, isopropyl acetate, butyl acetate, or cellosolve acetate.

Meanwhile, the composition of one embodiment may further include at least one additive selected from the group consisting of a dispersant, a leveling agent, a wetting agent, a defoaming agent, and an antistatic agent. In this case, the additive may be added within the range of 0.01 to 10 parts by weight based on 100 parts by weight of the binder-forming compound.

The infiltration layer/antiglare layer may be formed by coating the composition of one embodiment described above onto one surface of the light-transmitting substrate film, followed by drying and photo-curing. These drying and photo-curing conditions may be in accordance with the conditions of a general process for forming the antiglare layer, and specific process conditions are also described in Examples provided hereinafter.

Meanwhile, according to another embodiment of the present invention, an optical film formed from the composition of one embodiment described above. An example of the optical film comprises: a light-transmitting substrate film; an infiltration layer which is formed by infiltration in the light-transmitting substrate film so as to overlap with at least a part of the light-transmitting substrate film, and includes a first binder containing a first (meth)acrylate-based cross-linked polymer; and an antiglare layer which includes a second binder containing a second (meth)acrylate-based cross-linked polymer, and at least two light-transmitting fine particles having a sub-micron (sub-µm) scale dispersed on the second binder, and is formed so as to have surface irregularities on the light-transmitting substrate film and infiltration layer, wherein the infiltration layer has a thickness of 50 nm or more and 2 µm or less, and wherein the antiglare layer has a total haze value of 1 to 5% and a 60-degree gloss value of 75% to 90%.

As the optical film of the other embodiment is formed from the resin composition of one embodiment, a first binder containing a cross-linked copolymer of the (meth)acrylate-based compound having three or more functionalities and the permeable compound (i.e., a first (meth)acrylate-based cross-linked polymer) is permeated and formed in the light-transmitting substrate film. Thereby, for example, an infiltration layer as shown in FIGS. 1 and 2 is included.

Further, an antiglare layer including, as a second binder, a cross-linked copolymer of the polyfunctional (meth)acrylate-based compound that has not penetrated into the substrate film among the compositions of one embodiment (i.e., a second (meth)acrylate-based cross-linked polymer having a larger molecular weight than the first (meth)acrylate-based cross-linked polymer) is formed on the infiltration layer and the light-transmitting substrate film, and at least two light-transmitting fine particles, for example, the above-mentioned organic and inorganic fine particles, are included within the second binder to form surface irregularities.

At this time, the first and second binders are formed by a single photo-curing process, and at least a part of the polyfunctional (meth)acrylate compound forming the first and second binders can form crosslinking with each other, and thereby the infiltration layer and the antiglare layer are chemically bonded to each other. Therefore, the optical films of other embodiments can exhibit excellent adhesion between the substrate film/infiltration layer and the antiglare layer.

In addition, since the optical film is formed from the composition of one embodiment in which the permeable compound and/or the permeable solvent are contained in an appropriate ratio, the infiltration layer may be formed to have an appropriate thickness of 100 nm or more and 2 µm or less, or 150 nm or more and 1.5 µm or less, or 300 nm or more and 1.3 µm or less, or 500 nm or more and 1.0 µm or less. In addition, since the optical film has an appropriate ratio of the permeable compound and/or the permeable solvent, these components do not prevent aggregation of the light-transmitting fine particles, and as a result, the antiglare layer and the optical film can exhibit excellent antiglare property/optical property such as appropriate haze and low gloss, together with excellent surface hardness.

Therefore, since the optical film of another embodiment can have excellent adhesion to the substrate film and high surface hardness and also exhibit excellent antiglare property/optical property at the same time, it can be preferably used for various polarizing plates and/or image display devices.

Hereinafter, the above-mentioned optical film will be described in more detail. However, with respect to each component contained in the infiltration layer/the antiglare layer, the composition of one embodiment has already been described in detail, and therefore, the remaining items excluding this will now be mainly described.

In the optical film of the other embodiment, the antiglare layer may have a thickness of 1 to 10 µm, or 2 to 8 µm. Thereby, the above-mentioned light-transmitting fine particles form appropriate surface irregularities on the surface of the antiglare layer, and the antiglare layer can exhibit excellent antiglare properties. The ratio of the thickness between the antiglare layer and the infiltration layer is preferably controlled so that more improved adhesion between the substrate film and the antiglare layer can be exhibited.

In the optical film, the second binder may have a refractive index of 1.50 to 1.60. Thereby, the second binder of the antiglare layer and the light-transmitting fine particles have a proper refractive index difference, and for example, an absolute value of the refractive index difference between the second binder and the light-transmitting fine particles may be 0.25 or less, or 0.01 to 0.25, or 0.02 to 0.25, or 0.02 to 0.10. The antiglare layer can exhibit low gloss, appropriate haze properties and further improved antiglare properties.

The optical film of another embodiment not only has excellent mechanical properties such as hardness and adhesion according to each of the above-described respective components and constitution, but also can appropriately suppress scattering and reflection of external light and thus have excellent antiglare properties. Further, the optical film can exhibit excellent optical properties such as low glossiness and appropriate haze properties. Such excellent optical properties can be defined as a low glossiness of the surface. For example, the antiglare layer and the optical film may have a 60° gloss value of 75% to 90%, or 80% to 88%, and a 20° gloss value of 45% to 68%, or 55% to 67%.

Further, the optical film has a total haze value of 1 to 5%, or 1 to 4%, or 1 to 3.5%, and can maintain an appropriate level. When the total haze value becomes excessively high, it is obvious that the optical properties are degraded. Even when the total haze value becomes excessively low, the external reflection image is visible without being scattered, and therefore, the visibility and image sharpness of the screen may be deteriorated.

Meanwhile, the optical film of another embodiment described above may further include a low refractive index layer formed on the antiglare layer. Such low refraction layer may include a binder resin containing a (co)polymer of a photopolymerizable compound and hollow silica particles dispersed in the binder resin.

By including such a low refractive index layer, the reflection itself in the light-transmitting substrate film can be reduced, and as a result, the occurrence of interference fringes and the reflectance can be further reduced in the optical films of other embodiments. Further, by using such a low refractive index layer, the diffuse reflection on the display surface of the image display device can be reduced, thereby further improving resolution and visibility.

The low refraction layer may have a refractive index of, for example, 1.3 to 1.5 and a thickness of 1 to 300 nm in order to effectively suppress the reflection in the substrate film or the diffuse reflection on the display surface of the display device.

Meanwhile, the low refractive index layer may be formed from a photo-curable coating composition for forming a low refractive index layer including a photopolymerizable compound and hollow silica particles. Specifically, the low refractive index layer may include a binder resin containing a (co)polymer of a photopolymerizable compound and hollow silica particles dispersed in the binder resin.

The photopolymerizable compound contained in the low refractive index layer may include a monomer or an oligomer containing a (meth)acrylate or vinyl group. Specifically, the photopolymerizable compound may include a monomer or an oligomer containing one or more, two or more, or three or more of (meth)acrylate or vinyl groups.

Specific examples of the monomer or oligomer containing (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or a urethane-modified acrylate oligomer, an epoxide acrylate oligomer, an ether acrylate oligomer, a dendritic acrylate oligomer, or a mixture of two or more thereof. Herein, the molecular weight of the oligomers is preferably 1,000 to 10,000.

Specific examples of the monomer or oligomer containing a vinyl group include divinylbenzene, styrene, and para-methyl styrene.

Meanwhile, the photo-curable coating composition for forming a low reflective index layer may further include a fluorine-based compound containing a photoreactive functional group. Accordingly, the binder resin of the low refractive index layer may include a cross-linked polymer between the photopolymerizable compound already described above and the fluorine-based compound containing the photoreactive functional group.

The fluorine-based compound containing the photoreactive functional group may include or be substituted with at least one photoreactive functional group, and the photoreactive functional group refers to a functional group which can participate in a polymerization reaction by irradiation of light, for example, by irradiation of visible light or ultraviolet light. The photoreactive functional group may include various functional groups known to be able to participate in a polymerization reaction by irradiation of light. Specific examples thereof include a (meth)acrylate group, an epoxide group, a vinyl group or a thiol group.

The fluorine-based compound containing the photoreactive functional group may have a fluorine content of 1 to 25% by weight. When the content of fluorine in the fluorine-based compound containing the photoreactive functional group is too small, it may be difficult to sufficiently secure the physical properties such as stain resistance or alkali resistance. In contrast, when the content of fluorine in the fluorine-based compound containing the photoreactive functional group is too large, the surface properties such as scratch resistance of the low refractive index layer may be deteriorated.

The fluorine-based compound containing the photoreactive functional group may further include silicon or a silicon compound. That is, the fluorine-based compound containing the photoreactive functional group may optionally contain silicon or a silicon compound therein.

The fluorine-based compound containing the photoreactive functional group may have a weight average molecular weight (weight average molecular weight in terms of polystyrene measured by GPC method) of 2,000 to 200,000. When the weight average molecular weight of the fluorine-based compound containing the photoreactive functional group is too small, the low refractive index layer obtained from the photo-curable coating composition of the embodiment may not have sufficient alkali resistance. Further, when the weight average molecular weight of the fluorine-based compound containing the photoreactive functional group is too large, the low refractive index layer obtained from the photo-curable coating composition of the embodiment above may not have sufficient durability and scratch resistance.

The photo-curable coating composition may contain 0.1 to 10 parts by weight of the fluorine-based compound containing the photoreactive functional group based on 100 parts by weight of the photopolymerizable compound of the monomer or oligomer containing the (meth)acrylate or vinyl group. When the fluorine-based compound containing the photoreactive functional group is added in excess relative to the photopolymerizable compound, the coating properties of the photo-curable coating composition may be reduced, or the low refractive index layer obtained from the photo-curable coating composition may not have sufficient durability or scratch resistance. In contrast, when the amount of the fluorine-based compound containing the photoreactive functional group is too small relative to the photopolymerizable compound, the low refractive index layer obtained from the photo-curable coating composition may not have sufficient alkali resistance.

Meanwhile, the hollow silica particles refer to silica particles which have a maximum diameter of less than 200 nm and have voids on the surface and/or inside thereof. The hollow silica particles may have a diameter of 1 to 200 nm, or 10 to 100 nm.

As for the hollow silica particles, silica particles whose surface is coated with a fluorine-based compound may be used either alone or in combination with silica particles whose surface is not coated with a fluorine-based compound. When the surface of the hollow silica particles is coated with a fluorine-based compound, the surface energy may be further reduced. Accordingly, the hollow silica particles may be more uniformly distributed in the photo-curable coating composition, and the durability and scratch resistance of the film obtained from the photo-curable coating composition may be further improved.

Further, the hollow silica particles may be included in the composition in a colloidal phase dispersed in a predetermined dispersion medium. The colloidal phase containing the hollow silica particles may contain an organic solvent as a dispersion medium.

Herein, examples of the organic solvent in the dispersion medium include alcohols such as methanol, isopropyl alcohol, ethylene glycol and butanol, etc.; ketones such as methyl ethyl ketone and methyl isobutyl ketone, etc.; aromatic hydrocarbons such as toluene and xylene, etc.; amides such as dimethylformamide, dimethylacetamide and N-methylpyrrolidone; etc.; esters such as ethyl acetate, butyl acetate and gamma-butylolactone, etc; ethers such as tetrahydrofuran and 1,4-dioxane, etc.; or a mixture thereof.

The photo-curable coating composition may include 10 to 500 parts by weight or 50 to 400 parts by weight of the hollow silica particles based on 100 parts by weight of the photopolymerizable compound. When the hollow silica particles are added in an excessive amount, the scratch resistance and abrasion resistance of the coating film may be reduced due to a decrease in the content of the binder. Further, when the hollow silica particles are added in a small amount, uniform film formation of the hollow silica particles may not be not performed, and the desired effect may not be exhibited due to the increase of the reflectance and the refractive index.

As the photopolymerization initiator, any compound known to be usable in the photo-curable coating composition may be used without particular limitation. Specifically, a benzophenone-based compound, an acetophenone-based compound, a nonimidazole-based compound, a triazine-based compound, an oxime-based compound, or a mixture of two or more thereof may be used.

The photopolymerization initiator may be used in an amount of 1 to 100 parts by weight based on 100 parts by weight of the photopolymerizable compound.

Meanwhile, the photo-curable coating composition may further include an organic solvent.

Non-limiting examples of the organic solvent include ketones, alcohols, acetates and ethers, or mixtures of two or more thereof.

Specific examples of the organic solvent include ketones such as methyl ethyl ketone, methyl isobutyl ketone, acetylacetone or isobutyl ketone, etc.; alcohols such as methanol, ethanol, n-propanol, i-propanol, n-butanol, i-butanol or t-butanol, etc.; acetates such as ethyl acetate, i-propyl acetate, or polyethylene glycol monomethyl ether acetate, etc.; ethers such as tetrahydrofuran or propylene glycol monomethyl ether, etc.; or a mixture of two or more thereof.

The organic solvent may be added at the time of mixing the respective components to be included in the photo-curable coating composition, or may be included in the photo-curable coating composition as the respective components are added to the organic solvent in a state of being dispersed in or mixed with the organic solvent.

Meanwhile, the low refractive index layer included in the optical film of another embodiment can be obtained by coating the above-mentioned photo-curable coating composition onto the antiglare layer, and then drying and photo-curing the coated product. The specific process conditions of such a low refractive index layer may be subject to conditions that are obvious to those skilled in the art.

According to another embodiment of the invention, there may be provided a polarizing plate and image display device including the optical film described above.

An example of such a polarizing plate and an image display device can be constructed as follows.

The image display device may be a liquid crystal display device including a pair of polarizing plates facing each other; a thin film transistor, a color filter, and a liquid crystal cell sequentially stacked between the pair of polarizing plates; and a backlight unit. Among the polarizing plates, the polarizing plate of at least the image display surface side may include a polarizing element, and an optical film of the above-described embodiment formed on the polarizing element.

Such an optical film acts, for example, as a polarizer protective film and/or an antireflection film to exhibit the excellent properties already mentioned above. On the other hand, since the polarizing plate and/or the image display device can follow a conventional configuration except that it includes the optical film of the embodiment, additional description thereof will be omitted.

Advantageous Effects

According to the present invention, there can be provided a composition for forming an optical film which improves adhesion between an antiglare layer and a light-transmitting substrate film and enables the antiglare layer and the optical film to exhibit excellent optical properties such as appropriate haze value, low gloss value, and excellent antiglare properties.

By using such a composition, it is possible to provide an optical film that simultaneously satisfies excellent mechanical properties and optical properties, and this optical film can be preferably used in various image display devices to greatly improve the visibility and the like.

BRIEF DESCRIPTION OF THE DRAWINGS

FIG. 1 is an electron micrograph showing the cross-sectional shape of the optical film formed in Example 2 (particularly, the formation of substrate film/infiltration layer/antiglare layer).

FIG. 2 is an electron micrograph showing the cross-sectional shape of the optical film formed in Example 3 (in particular, the formation of the substrate film/infiltration layer/antiglare layer).

DETAILED DESCRIPTION OF THE EMBODIMENTS

Specific embodiments of the present invention are now described in more detail by way of the following examples. However, these examples are given for illustrative purposes only, and the scope of the present invention is not intended to be limited to or by the examples.

<Preparation Example: Preparation of Composition for Forming an Antiglare Layer/an Infiltration Layer>

(1) Preparation of Composition for Forming an Antiglare Layer

The components shown in Tables 1 and 2 below were uniformly mixed to prepare a composition for forming an optical film (antiglare layer). The contents of all components used in Tables 1 and 2 are shown in parts by weight.

TABLE 1

|  |  | Preparation Example 1 | Preparation Example 2 | Preparation Example 3 | Preparation Example 4 | Preparation Example 5 | Preparation Example 6 |
|---|---|---|---|---|---|---|---|
| Permeable compound | THFA |  | 1.79 | 1.79 | 3.6 |  |  |
|  | HEA | 1.8 |  |  |  | 1.79 | 3.45 |
| Other binder | UA-306T |  | 3.60 | 8.80 | 3.6 |  | 3.45 |
|  | Beamset371 | 12.4 | 8.80 | 3.60 |  |  |  |
|  | 8BR-500 |  |  |  | 7.2 | 12.41 | 7.30 |
|  | TMPTA |  | 4.14 |  | 3.6 | 12.41 | 6.20 |
|  | PETA | 12.4 | 8.27 | 12.41 | 8.9 |  | 6.20 |

TABLE 1-continued

|  |  | Preparation Example 1 | Preparation Example 2 | Preparation Example 3 | Preparation Example 4 | Preparation Example 5 | Preparation Example 6 |
|---|---|---|---|---|---|---|---|
| Organic fine particles (refractive index) | 103BQ (about 1.52) | 1.1 | 0.44 | 0.67 | 0.4 | | |
|  | 113BQ (about 1.56) | | 0.44 | 0.33 | 0.4 | 0.99 | 0.91 |
| Inorganic fine particles (refractive index) | MA-ST (12 nm) (1.430) | 0.1 | 0.29 | 0.17 | 0.3 | 0.17 | 0.26 |
| Initiator | I184 | 1.8 | 0.80 | 0.80 | 1.8 | 0.80 | 0.80 |
| Leveling agent | T100 | 0.5 | 0.13 | 0.13 | 0.4 | 0.13 | 0.13 |
| Permeable solvent | Methyl ethyl ketone | 1.1 | 1.48 | 1.48 | 1.1 | 1.34 | 1.34 |
| Other solvent | IPA | 34.4 | 34.91 | 34.91 | 22.9 | 34.98 | 34.98 |
|  | EtOH | 34.4 | 34.91 | 34.91 | 45.8 | 34.98 | 34.98 |
| Total |  | 100 | 100 | 100 | 100 | 100 | 100 |
| Permeable solvent/Binder-forming compound (weight ratio) |  | 0.041 | 0.06 | 0.06 | 0.04 | 0.05 | 0.05 |

TABLE 2

|  |  | Comparative Preparation Example 1 | Comparative Preparation Example 2 | Comparative Preparation Example 3 | Comparative Preparation Example 4 | Comparative Preparation Example 5 | Comparative Preparation Example 6 | Comparative Preparation Example 7 |
|---|---|---|---|---|---|---|---|---|
| Permeable compound | THFA |  |  |  |  |  |  |  |
|  | HEA |  |  | 12.4 |  |  |  |  |
| Other binder | UA-306T |  |  |  | 3.45 | 3.60 | 3.45 | 3.60 |
|  | Beamset371 | 13.3 | 13.5 | 12.4 |  | 8.80 |  | 8.80 |
|  | 8BR-500 |  |  |  | 10.75 |  | 7.30 |  |
|  | TMPTA |  |  |  | 6.20 | 8.27 | 6.20 | 8.27 |
|  | PETA | 13.3 | 13.5 | 1.8 | 6.20 | 5.93 | 6.20 | 5.93 |
| Organic fine particles (refractive index) | 103BQ (about 1.52) | 1.2 | 1.1 | 0.5 |  | 0.44 |  | 0.44 |
|  | 113BQ (about 1.56) |  |  | 0.5 | 0.91 | 0.44 | 0.91 | 0.44 |
| Inorganic fine particles (refractive index) | MA-ST (12 nm) (1.430) | 0.2 | 0.1 | 0.2 | 0.26 | 0.29 | 0.26 | 0.29 |
| Initiator | I184 | 1.8 | 1.8 | 1.8 | 0.80 | 0.80 | 0.80 | 0.80 |
| Leveling agent | T100 | 0.4 |  | 0.4 | 0.13 | 0.13 | 0.13 | 0.13 |
| Permeable solvent | Methyl ethyl ketone |  | 5.8 |  | 1.34 | 1.48 | 5.86 |  |
| Other solvent | IPA | 34.9 | 32.1 | 35.0 | 34.98 | 34.91 | 32.72 | 47.50 |
|  | EtOH | 34.9 | 32.1 | 35.0 | 34.98 | 34.91 | 32.72 | 23.80 |
| Total |  | 100 | 100 | 100 | 100 | 100 | 100 | 100 |
| Permeable solvent/Binder-forming compound (weight ratio) |  | 0 | 0.21 | 0 | 0.05 | 0.06 | 0.22 | 0 |

1) THFA: tetrahydrofurfuryl alcohol
2) HEA: 2-hydroxyethyl acrylate
3) UA-306T: (Kyoeisha): hexafunctional acrylate-based compound formed by reacting toluene diisocyanate with two pentaerythritol triacrylates
4) Beamset 371 (ARAKAWA CHEMICAL): polymer to which an epoxy acrylate functional group having about 50 or more functionalities is bonded to a polyurethane/ester backbone
5) 8BR-500 (TAISEI FINE CHEMICAL): polymer to which a urethane acrylate functional group with about 40 functionalities is bonded to a polyacryl backbone
6) TMPTA: trimethylolpropane triacrylate
7) PETA: Pentaerythritol triacrylate
8) I184 (Irgacure 184): photoinitiator, manufactured by Ciba
9) T-100 (Tego glide 100): Leveling agent, manufactured by Evonik
10) 103BQ (XX-103BQ, manufactured by Sekisui Plastic): PMMA-PS cross-linked copolymer fine particles having a refractive index of 1.515 (about 1.52) and an average particle diameter of 2 μm
11) 113BQ (XX-113BQ, manufactured by Sekisui Plastic): PMMA-PS cross-linked copolymer fine particles having a refractive index of 1.555 (about 1.56) and an average particle diameter of 2 μm
12) MA-ST: spherical silica fine particles having a volume average particle diameter of 12 nm and a refractive index of 1.43 (manufactured by Nissan Chemical)

Examples 1 to 6 and Comparative Examples 1 to 7: Preparation of Optical Film

As shown in Tables 3 and 4 below, the compositions prepared in Preparation Examples 1 to 6 or Comparative Preparation Examples 1 to 7 were respectively coated onto a PET substrate film having a thickness of 80 μm and a refractive index of 1.6 to 1.7 (or an acrylic substrate film having a thickness of 60 μm and a refractive index of 1.4 to 1.6), dried at 90° C. for 1 minute, and then irradiated with ultraviolet rays of 150 mJ/cm$^2$ to prepare an antiglare layer.

An antiglare layer was formed and an optical film was prepared. The cross sections of the optical films of Examples 2 and 3 were observed with an electron microscope, and the formation of infiltration layer was confirmed. The electron micrographs of Examples 2 and 3 are shown in FIGS. 1 and 2, respectively (In FIG. 1, the light-transmitting fine particles are not observed due to the observation direction). In the same manner, it was confirmed whether or not an infiltration layer was formed in the remaining Examples and Comparative Examples.

Experimental Example: Measurement of Physical Properties of Optical Film

The physical properties of the optical films prepared above were measured according to the following methods, and the results are shown in Tables 3 and 4 below.

1. Measurement of Refractive Index

The refractive indexes of the binder and the antiglare layer contained in the optical film were measured in a state of being coated on the wafer using an ellipsometer. More specifically, the refractive indexes of the binder, the antiglare layer and the low refractive index layer were measured by a method in which each composition was applied to a 3 cm×3 cm wafer, coated using a spin coater (coating condition: 1500 rpm, 30 seconds), dried at 90° C. for 2 minutes and irradiated with ultraviolet rays under the condition of 180 mJ/cm$^2$ under nitrogen purge. Thereby, each coating layer having a thickness of 100 nm was formed.

The ellipsometry was measured for the coating layer at an incidence angle of 70° over a wavelength range of 380 nm to 1000 nm by using J. A. Woollam Co. M-2000 apparatus. The measured ellipsometry data (LP, A) was fitted to a Cauchy model of the following general formula 1 using Complete EASE software so that MSE became 3 or less.

$$n(\lambda) = A + \frac{B}{\lambda^2} + \frac{C}{\lambda^4}$$

wherein 1, n(λ) is a refractive index at a wavelength λ (300 nm to 1800 nm), and A, B and C are Cauchy parameters.

Meanwhile, the refractive indexes of the substrate film and the respective fine particles used information provided on the commercially available product.

2. Evaluation of Infiltration Layer/Antiglare Layer

The average thickness of the infiltration layer/the antiglare layer was measured through the electron micrographs as shown in FIGS. 1 and 2.

3. Evaluation of Total/Internal/External Haze Value

A 4 cm×4 cm optical film specimen was prepared, the average value was calculated by measuring three times with a haze meter (HM-150, A light source, Murakami Color Research Laboratory), which was calculated as a total haze value. In the measurement, the transmittance was measured according to JIS K 7361, and the haze value was measured according to JIS K 7105. In measuring the internal haze value, an adhesive film having a total haze value of 0 was bonded to the coated surface of the optical film to be measured to make the irregularities of the surface smooth, and an internal haze value was measured in the same manner as that of the total haze value.

4. Evaluation of 20°/60° Gloss Value

The 20°/60° gloss value was measured using the micro-TRI-gloss manufactured by BYK Gardner Co., Ltd. At the time of measurement, a black tape (3M) was attached to the surface of the substrate film on which the coating layer was not formed so as not to transmit light. The 20°/60° gloss value was measured by varying the incidence angle of light to 20°/60°, and the average value measured five or more times was calculated as the gloss value.

5. Evaluation of Pencil Hardness (500 gf)

The pencil hardness was measured according to ASTM D3363, and the measuring instrument used was a pencil hardness tester (JS Tech). During the measurement, the film specimen was cut into 7 cm×7 cm and fixed on a glass plate. The pencil, product of Mitsubishi Pencil Co., Ltd., Japan, was used to measure the hardness under a load of 500 g. When measured five times per pencil and four or more times were better, it was evaluated that there was no scratch at the corresponding hardness. The measurement length was 5 cm, and the hardness was determined by excluding scratches at 0.5 cm in the early stage.

6. Adhesion Evaluation

The adhesion between the antiglare layer and the substrate film was measured on the surface of the scattering side.

TABLE 3

|  | Example 1 | Example 2 | Example 3 | Example 4 | Example 5 | Example 6 |
|---|---|---|---|---|---|---|
| Substrate film | PET | Acryl | Acryl | PET | Acryl | Acryl |
| Refractive index of substrate film | 1.6~1.7 (birefringence) | 1.4~1.6 | 1.4~1.6 | 1.6~1.7 (birefringence) | 1.4~1.6 | 1.4~1.6 |
| Composition | Preparation Example 1 | Preparation Example 2 | Preparation Example 3 | Preparation Example 4 | Preparation Example 5 | Preparation Example 6 |
| Thickness of antiglare layer (μm) | 4.5 | 4.4 | 5 | 5 | 5.1 | 5.5 |
| Antiglare layer (refractive index of second binder) | 1.524 | 1.522 | 1.526 | 1.524 | 1.516 | 1.519 |
| Formation of infiltration layer | ○ | ○ | ○ | ○ | ○ | ○ |
| Thickness of infiltration layer | ~500 nm | ~900 nm | ~600 nm | ~500 nm | ~600 nm | ~1000 nm |
| Total haze value | 1.1 | 2.9 | 3.1 | 2.1 | 2.5 | 2.6 |
| Internal haze value | 0.6 | 2.1 | 2.3 | 1.8 | 1.3 | 1.6 |
| Gloss value (20-degree) | 67 | 64 | 65 | 65.2 | 63 | 63 |
| Gloss value (60-degree) | 86.0 | 84 | 86 | 86.3 | 85 | 87 |

TABLE 3-continued

| Pencil hardness | 3H | 3H | 3H | 3H | 3H | 3H |
|---|---|---|---|---|---|---|
| Adhesion | >4B | 5B | 5B | >4B | 5B | 5B |

TABLE 4

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Substrate film | PET | PET | PET | Acryl | Acryl | Acryl | Acryl |
| Refractive index of substrate film | 1.6~1.7 (birefringence) | 1.6~1.7 (birefringence) | 1.6~1.7 (birefringence) | 1.4~1.6 | 1.4~1.6 | 1.4~1.6 | 1.4~1.6 |
| Composition | Comparative Preparation Example 1 | Comparative Preparation Example 2 | Comparative Preparation Example 3 | Comparative Preparation Example 4 | Comparative Preparation Example 5 | Comparative Preparation Example 6 | Comparative Preparation Example 7 |
| Thickness of antiglare layer | 4.5 | 4.5 | 4.5 | 5 | 4.6 | 5.4 | 5.1 |
| Antiglare layer (refractive index of second binder) | 1.524 | 1.524 | 1.523 | 1.522 | 1.521 | 1.519 | 1.521 |
| Formation of infiltration layer | X | ○ | ○ | X | X | ○ | X |
| Thickness of infiltration layer | 0 | ~500 nm | ~1.5 μm | 0 | 0 | ~1100 nm | 0 |
| Total haze value | 1.2 | 0.7 | 2.2 | 3.2 | 3.1 | 1.9 | 2.9 |
| Internal haze value | 0.7 | 0.6 | 2.0 | 2.3 | 2.1 | 1.7 | 1.8 |
| Gloss value (20-degree) | 66.6 | 70.7 | 70.0 | 65 | 64 | 70 | 64 |
| Gloss value (60-degree) | 87.1 | 92.6 | 91.7 | 86 | 85 | 91.5 | 86 |
| Pencil hardness | 3H | 3H | H | 3H | 3H | 3H | 3H |
| Adhesion | 2B | >4B | 3B | <3B | <3B | 5B | <3B |

Referring to Table 3, it was confirmed that the optical films of Examples exhibit not only excellent optical properties such as low gloss value and appropriate level of haze property, but also excellent mechanical properties such as high surface hardness and adhesion.

On the contrary, it was confirmed that in the case of Comparative Examples 1 to 7, which are formed from a composition not containing the permeable compound and/or the permeable solvent or deviating from proper ratio/content, an infiltration layer is not formed and thus the adhesion is deteriorated (Comparative Examples 1, 4, 5 and 7), and the agglomeration of the organic fine particles is not properly controlled during the formation of the infiltration layer so that the surface hardness is poor (Comparative Example 3) and the optical properties (the haze value is too low or the gloss value was high) are poor(Comparative Examples 2, 3, and 6).

For reference, if the gloss value is too high, the reflection of external light cannot be suppressed properly, and if the haze value is too low, the external reflection image is visible without being scattered, so that the visibility and image sharpness of the screen are poor.

The invention claimed is:
1. An optical film comprising:
a light-transmitting substrate film;
an infiltration layer having at least a part that is infiltrated into the light-transmitting substrate film so as to overlap with at least a part of the light-transmitting substrate film, and including a first binder containing a first (meth)acrylate-based cross-linked polymer; and
an antiglare layer which includes a second binder containing a second (meth)acrylate-based cross-linked polymer, and at least two light-transmitting fine particles dispersed on the second binder, and is formed so as to have surface irregularities on the infiltration layer, wherein the at least two light-transmitting fine particles comprise organic fine particles having a particle diameter of 1 to 5 μm and inorganic fine particles having a particle diameter of 10 nm to 300 nm,
wherein the infiltration layer has a thickness of 600 nm or more and 1.0 μm or less,
wherein the antiglare layer has a thickness of 4.4 to 10 μm, and
wherein the optical film has a total haze value of 1 to 5% and a 60-degree gloss value of 80% to 88%.

2. The optical film of claim 1, wherein the optical film has a 20-degree gloss value of 45% to 68%.

3. The optical film of claim 1, wherein the second binder has a refractive index of 1.50 to 1.60.

4. The optical film of claim 1, further comprising a low refractive index layer which is formed on the antiglare layer and includes a binder resin containing a (co)polymer of a photopolymerizable compound and hollow silica particles dispersed in the binder resin.

5. The optical film of claim 4, wherein the low refractive index layer has a refractive index of 1.3 to 1.5 and a thickness of 1 to 300 nm.

6. A polarizing plate comprising the optical film of claim 1.

* * * * *